United States Patent [19]

Held et al.

[11] 3,993,989
[45] Nov. 23, 1976

[54] ELF COMMUNICATIONS SYSTEM USING HVDC TRANSMISSION LINE AS ANTENNA

[75] Inventors: Gedaliahu Held; K. R. Ananda Murthy, both of Manhattan Beach, Calif.

[73] Assignee: TRW Inc., Redondo Beach, Calif.

[22] Filed: May 19, 1975

[21] Appl. No.: 578,795

[52] U.S. Cl. .............................. 340/310 R; 343/905
[51] Int. Cl.² ........................................ H04M 11/04
[58] Field of Search ...... 340/310 R, 310 A, 310 CP, 340/216; 325/30, 163, 28; 178/66 A; 179/170 D, 170 J, 82; 343/904, 905, 720

[56] References Cited
UNITED STATES PATENTS

| | | | |
|---|---|---|---|
| 786,925 | 4/1905 | Trump | 340/310 R |
| 1,698,770 | 1/1929 | Ohl | 340/310 R |
| 2,032,360 | 3/1936 | Green | 340/310 A |
| 2,398,741 | 4/1946 | Halstead | 179/82 |
| 2,515,663 | 7/1950 | O'Brien | 179/82 |
| 2,977,417 | 3/1961 | Doelz et al. | 178/51 |
| 3,623,160 | 11/1971 | Giles | 325/163 |
| 3,641,536 | 2/1972 | Prosprich | 340/310 R |
| 3,904,966 | 9/1975 | Firman | 325/163 |

OTHER PUBLICATIONS

Intake Magazine, "The How of the Big Switch to Direct Current", Apr. 1970.

Primary Examiner—John W. Caldwell
Assistant Examiner—James J. Groody
Attorney, Agent, or Firm—Jerry A. Dinardo; Stephen J. Koundakjian

[57] ABSTRACT

An extremely low frequency (ELF) Communication System is disclosed for worldwide communication from land to receiving stations thousands of miles away using the existing DC power transmission lines of the Pacific Intertie power transmission system as the antenna. An ELF communication system requires a very long uninterrupted antenna or a series of long parallel antennas. The transmission lines of the Pacific Intertie DC power system lend themselves to be used as the required long antenna for the disclosed ELF system. The DC lines together with the associated ELF transmitter and coupling devices comprise the global ELF communication system disclosed herein.

4 Claims, 2 Drawing Figures

3,993,989

ELF COMMUNICATIONS SYSTEM USING HVDC TRANSMISSION LINE AS ANTENNA

BACKGROUND OF THE INVENTION

This invention relates to an extremely low frequency communications system which is integrated with a high voltage direct current power transmission system.

Over the past several years, extensive research and development effort has been directed towards the design of a reliable and survivable extremely low frequency (ELF) communications system. The implementation of such a system of low frequency operation in the range of 30–100 Hz with its unique capabilities to penetrate ocean depths for communication between a shore station and submarines located anywhere in the oceans of the world ranks high in the list of priorities for our national defense.

Because of very high implementation costs and concern over environmental issues more attention has recently been directed to consideration of surface installed designs rather than buried installations. The relaxation of the survivability requirements has opened the way for many system cost reductions. However, even those systems that are currently being considered use previously designed subsystems that are still prohibitively high in cost. It is therefore unlikely that a real breakthrough in the high cost can be achieved unless there is a radical departure from system concepts heretofore proposed.

SUMMARY OF THE INVENTION

This invention is predicated on the realization that an existing high voltage direct current (HVDC) power system transmission line can be used as a transmitting antenna for an ELF communications system.

In accordance with one embodiment, an ELF communications system is integrated into a HVDC power transmission system that includes two distantly spaced terminal stations each equipped with inverter/converter means and interconnected with transmission lines that transfer DC power between the stations. The communications system comprises a transmitter for generating an ELF signal, means for coupling the ELF signal to the HVDC power transmission line so that the latter serves as an antenna for radiating the communications signal, and means in series with the power transmission line for isolating the inverter/converter means at the terminal stations from the AC signal.

This invention takes advantage of existing power transmission facilities, and simplifies ELF system design. In spite of the fact that the present design involves an ELF transmitter coupled to an 800,000 volt direct current transmission line which conveys power over a distance of 850 miles, this invention is not limited in operation by either power line characteristics, or line length, or both. The power line characteristics can be different, and the line length will vary, even though the line length and the ELF operating frequency may be interdependent.

The advantages of utilizing an existing power transmission facility for the dual purpose of power transmission and ELF operation are many. Because the existing power lines are used as transmitting antennas, the cost for implementation and operation is low; because the power lines already exist, there is no problem involving right-of-way; and because the power lines provide a larger bandwidth, higher anti-jamming protection is available.

DESCRIPTION OF THE PREFERRED EMBODIMENT

The ELF communication system according to the invention will now be described as integrated into the Pacific Intertie HVDC Power Transmission System. The Pacific Intertie HVDC Power Transmission System comprises two transmission lines at DC voltages of +400 KV and −400 KV respectively running north and south between the Celilo converter station at the border of Oregon and Washington and the Sylmar converter station in Los Angeles, California. The length of the lines in each direction is about 850 statute miles and the nominal power capacity is about 1350 megawatts. The lines carry an average current of 2000 amperes DC and they are grounded at both ends. Since these grounds are located at the midpoints of a set of series connected rectifier valves, they are balanced and the leakage current to ground is only about 20 amperes.

There are no intermediate power transfer points between the Celilo and Sylmar converter stations. Power is distributed only from the two converter stations and since the converter stations have inverter capability, power can flow in either direction depending upon the particular need of the area. During rainy seasons, power generated from hydroelectric stations in the Pacific Northwest area flows to the Celilo converter station where the AC power is converted into DC power and transmitted to the Sylmar station. At the Sylmar station, the DC power is inverted back to AC power and distributed to the appropriate regions in the Pacific Southwest. This process is reversed when there is a need for power in the Pacific Northwest and power flows back from Sylmar to Celilo for inversion to AC and then for distribution.

Figure 1:
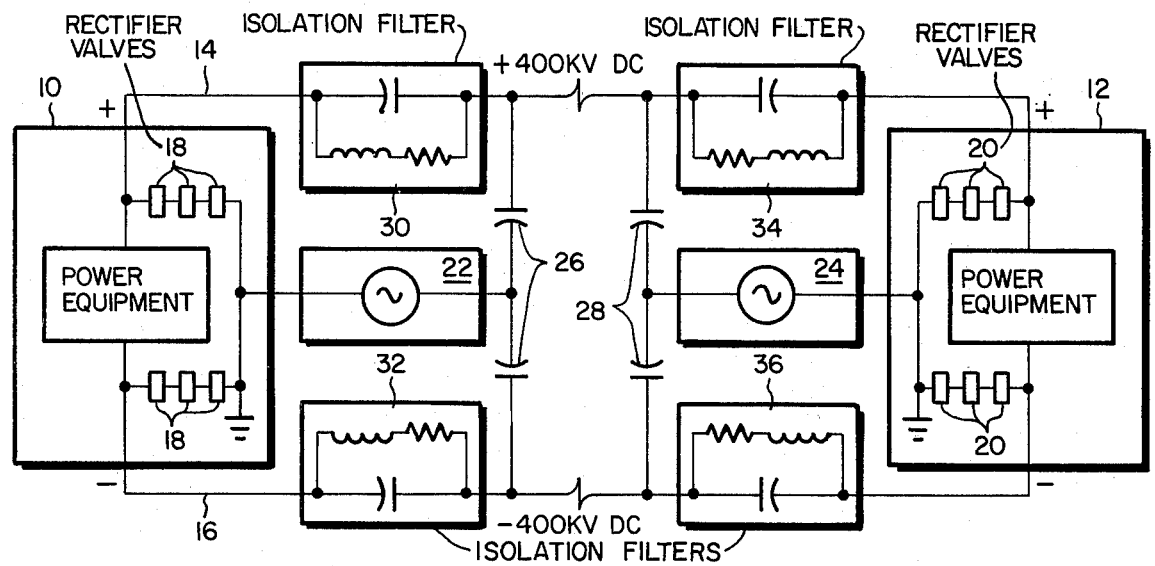
FIG. 1 is a diagrammatic view showing an ELF communication system utilizing an HVDC power transmission line as transmitting antenna.

Referring now to FIG. 1, there is shown a first inverter/converter station 10, such as the one at Sylmar, and a second inverter/converter station 12, such as the one at Celilo, separated from the first station 10 by a substantial distance. A first high voltage DC transmission line 14 and a second high voltage DC transmission line 16 connects the two stations 10 and 12. The first line 14 carries a positive voltage of 400 KV and the second line 16 carries a negative voltage of the same amount, giving a total voltage of 800 KV between the two lines.

Each of the stations 10 and 12 are equipped with series connected rectifier valves 18 and 20 respectively. Lines 14 and 16 are grounded across the series connected rectifier valves 18 and 20. The first station 10 has the capacity to convert the AC power at that station to DC power for transmission along the lines 14 and 16 to the second station 12 where the DC power is inverted to AC. Likewise, the second station 12 has the capability to convert the AC power at that station to DC power for transmission along the lines 14 and 16 to the first station 10 where the DC power is inverted to AC.

In accordance with the invention, the transmission lines 14 and 16 are used as an antenna for radiating an extremely low frequency (ELF) electromagnetic signal for communication to submerged submarines. At a carrier frequency of 30–100 Hz, and preferably at 75 Hz, the 850 mile long transmission lines 14 and 16 are approximately one-fourth to one-half wavelength long. As shown diagrammetically in FIG. 1, the transmission lines 14 and 16 are fed a modulated ELF signal from a pair of spaced apart transmitters 22 and 24. Although one transmitter may be sufficient to generate the required power to drive the antenna, it would require higher operating voltage levels than would be required by two such transmitters. Although FIG. 1 shows the use of full length of 850 miles of lines as an antenna, it may be feasible to utilize a partial length of the DC lines for ELF communication purposes. Each transmitter 22, 24 is capable of generating power in the range of a few megawatts and will accept minimum shift keying (MSK) modulation.

The ELF signals are coupled to the lines 14 and 16 by capacitive means, although it may be feasible to employ inductive coupling. Thus, capacitive means 26 are shown for coupling the signal from the first transmitter 22 to the lines 14 and 16, and capacitive means 28 are shown for coupling the signal to the lines 14 and 16 from the second transmitter 24. The capacitive means 26 and 28 also serve to block the high DC voltage on the lines 14 and 16 from reaching the transmitters 22 and 24. The capacitive coupling means 26 and 28 are shown preferably in common mode connection. They are capable of withstanding both the full system voltage on each leg of 400 KV plus the driving point voltage supplied by all the ELF transmitters. The ELF voltage excursions on the 400 KV lines are designed to be lower than the ripple levels on the Intertie System, which is about 4 percent of the DC line voltage in order to avoid interference problems, although the systems would operate at higher excursion values.

To prevent intrusion of the modulated ELF signal into the rectifiers or inverters of the stations 10 and 12 and to assure a non-interference operation of the ELF system and the DC power system, a plurality of series isolation filter networks are inserted in series with the lines 14 and 16. Thus, a first isolation filter network 30 is inserted in series with the first line 14 between the coupling means 26 and the first station 10, a second isolation filter network 32 is inserted in series with the second line 16 between the coupling means 26 and the first station 10, a third isolation filter network 34 is inserted in series with the first line 14 between the coupling means 28 and the second station 12, and a fourth filter network 36 is inserted in series with the second line 16 between the coupling means 28 and the second station 12. Although each of the filter networks 30–36 comprise a typical parallel arrangement of capacitor means in parallel with inductor and resistor means as shown in FIG. 1, other filter networks may also be feasible. The filter networks 30–36 act as band stop filters at the ELF frequency.

Figure 2:
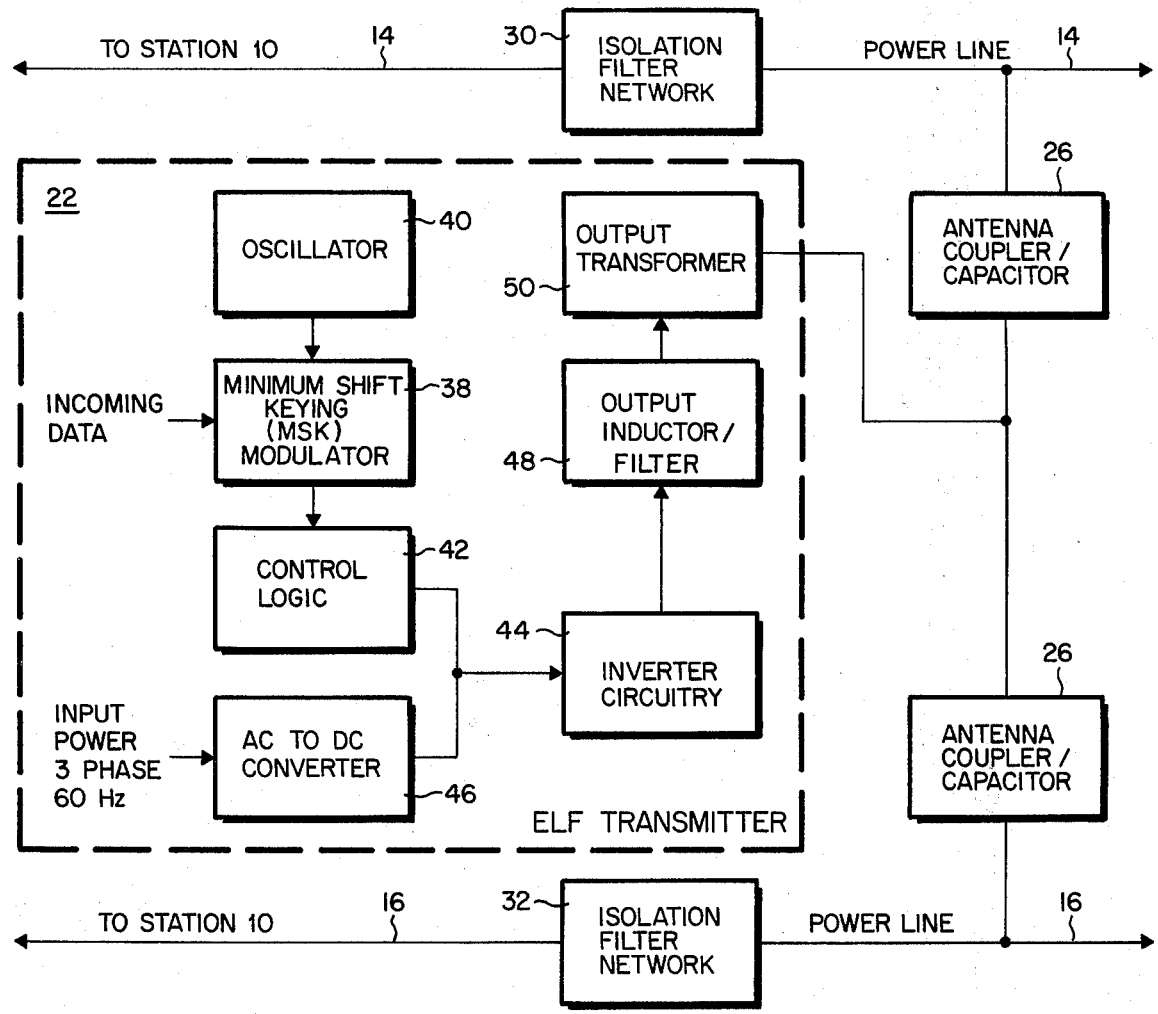
FIG. 2 is a diagrammatic view of a typical ELF transmitter used in the system of FIG. 1.

Reference is now made to the block diagram FIG. 2 for a more detailed description of a typical ELF transmitter that is used in the system of FIG. 1. It is understood that this description applies to both transmitters 22 and 24 of FIG. 1, although the description appearing below is given with reference to transmitter 22 specifically. A minimum shift keying (MSK) modulator 38 is shown which is fed signals from incoming data and from an oscillator 40 which is used to develop the ELF carrier signal. The MSK modulator 38 in conjunction with the oscillator 40 develops a digital signal which is coherent in data rate and carrier frequency and outputs this digital signal through control logic 42 to SCR inverter circuitry 44.

The control logic 42 interfaces with the MSK modulator 38 to provide drives, timing, and control commands to the SCR inverter circuitry 44, which amplifies the resulting digital signal to the required power level. Although it receives digital data input from the control logic 42, the SCR inverter circuitry 44 develops an analog output waveform that contains a certain amount of harmonics. These harmonics are filtered from the analog signal by an output inductor 48. After filtering, the analog signal is coupled by means of an output transformer 50 to the antenna coupler 26, which is identified in FIG. 1 as capacitor means 26.

Power for the SCR inverter circuitry 44 is derived from an AC-to-DC converter 46 which receives three phase 60 Hz input power, transforms it to a higher AC voltage, rectifies it to DC, and filters to reduce the ripple voltage before it is supplied to the SCR inverter circuitry 44.

It will be understood that there are many methods of meeting and mechanizing the functional requirements in the MSK modulator 38. In fact, the MSK modulator 38 has been implemented with software using a minicomputer.

What is claimed is:

1. In combination with a high voltage direct current power transmission system including first and second distantly spaced electrical power stations and a pair of electrical power transmission lines extending between said stations for conducting electrical current therebetween, said first station at least being provided with means for converting alternating current to direct current for transmission to said second station, and said second station at least being provided with means for inverting said direct current to alternating current for distribution by said second station, the improvement in an extremely low frequency (ELF) communication system utilizing said power transmission lines as an electromagnetic signal radiating antenna, comprising:
   a. means for generating an electromagnetic communication signal having a carrier frequency in the ELF frequency range;
   b. means for coupling the output of said generating means to said transmission lines, with said transmission lines having a length which is an appreciable part of the wavelength of said carrier frequency in the ELF range and thereby serving as radiating antenna for propagating said electromagnetic signal into space; and
   c. electrical isolation means connected with the said transmission lines between said coupling means and said stations for electrically isolating said communication system from said power stations and for electrically isolating said power stations from said communication system and for permitting simultaneous non-interfering operation of said power and communication systems.

2. The invention according to claim 1, wherein said generator means includes means for generating an ELF carrier signal and an MSK modulator for accepting incoming data and said ELF carrier signal and developing a digital signal having a coherent relation between the data rate of said incoming data and the frequency of said carrier signal to said transmission lines.

3. The invention according to claim 1, wherein the coupling means recited in (b) is capacitive.

4. The invention according to claim 1, wherein the electrical isolation means recited in (c) includes a series filter network for isolating the ELF signals from the power stations.

\* \* \* \* \*